Patented Mar. 29, 1938

2,112,249

UNITED STATES PATENT OFFICE 2,112,249

MANUFACTURE OF COMPOSITE ARTICLES

William Henry Moss, London, England, assignor to Celanese Corporation of America, a corporation of Delaware No Drawing. Application January 24, 1935, Serial No. 3,369. In Great Britain February 9, 1934

17 Claims. (Cl. 154—2)

This invention relates to the manufacture of composite articles, and particularly of composite articles in which the components are of a different nature.

In the production of composite articles from components of a different nature, it is frequently found that difficulties arise in obtaining satisfactory adhesion between the components, since an adhesive which is suitable for the one component and is capable of adhering firmly thereto may have no adhesive power, or insufficient power, for the other component, so that any joint effected between the two components is weak and easily fractured. Thus, ordinary glue is of little value as an adhesive for materials which have a relatively high resistance to penetration by water, or which are wetted only with difficulty.

It has now been discovered that very satisfactory adhesion between components of different natures, e. g. between a component having a relatively high resistance to penetration by water, such as a component having a basis of cellulose acetate or other organic derivative of cellulose, and a component having only a low resistance to penetration by water, may be obtained by means of an intermediate fabric layer which contains at least two different constituents, one of which can be caused to adhere firmly to the one component while another constituent has similar properties in relation to the second component. In this manner a composite article may be obtained in which each constituent of the fabric adheres to its particular component and holds it firmly, while by reason of the fabric construction the constituents are firmly united to each other. The constituents of the fabric may be capable of adhering directly to the components by the application of a suitable treatment, for example on the application of heat, with or without pressure, or by treatment with a solvent, or adhesion may be effected between the constituents of the fabric and the components of the composite article by means of a suitable adhesive or adhesives.

The fabric employed according to the present invention may be a knitted, netted or woven fabric, and may contain the constituents in any suitable proportions. Preferably a fabric containing two constituents is employed in which one face consists mainly or entirely of the one constituent while the other face consists mainly or entirely of the other constituent, as in this manner the bonding power of each constituent with respect to the component for which it is employed is used to the best advantage. Thus, of particular value are fabrics of satin or sateen construction. For example, in order to secure adhesion between a foil or the like containing cellulose acetate and wood or similar material, a cotton back satin having a cellulose acetate weft and a cotton warp is very suitable.

The invention is of particular value in affixing foils, films and the like (hereinafter referred to generically as "films") containing cellulose acetate to wood or similar material, but it will be understood that it is also applicable to the production of other types of composite articles and of composite articles containing other components, e. g. components containing other cellulose derivatives, particularly other organic derivatives of cellulose.

In order to effect adhesion between a film of cellulose acetate and wood or similar material, it is preferred to employ a fabric containing cellulose acetate yarn and cotton yarn, particularly a fabric in which one face is constituted mainly or entirely of the cellulose acetate yarn and the other of the cotton yarn. The surface of the film is moistened with a softening agent for the cellulose acetate, or with a thin solution of cellulose acetate in a solvent, and the cellulose acetate face of the fabric is then pressed against the film. Heat may if desired be employed to assist adhesion. The cotton face of the fabric is then caused to adhere to the surface of the wood or similar material by means of a suitable adhesive such as glue or casein.

The solvent or softening agent employed may be volatile, e. g. acetone, ethylene methylene ether, dioxane, or a mixture of ethylene or methylene chloride with ethyl or methyl alcohol, or a less volatile liquid may be employed, for example diacetone alcohol, ethyl lactate glycol monoacetate or methyl glycol monoacetate, or a homologue of dioxane, methylene ethylene ether or other cyclic ether, for example an alkylated dioxane. A mixture of softening agents may also be employed, for example, a mixture of a volatile solvent with a less volatile solvent. The softening medium may contain a plasticizer for the cellulose acetate, for example triacetin, tricresyl phosphate, triphenyl phosphate, diethyl phthalate, or an aryl sulphonamide or substituted sulphonamide, e. g. the isomeric monomethyl xylene sulphonamides.

The films of cellulose acetate or other derivative of cellulose may be of any suitable thickness, e. g. .005—.02 or .04" or more, and a fabric of any suitable weight may be employed, e. g. a fabric weighing about 4 ozs. per square yard.

While cellulose acetate is the most important cellulose derivative with which the present invention is concerned, materials containing other cellulose derivatives may also be treated, e. g. containing cellulose propionate, butyrate, benzoate, nitroacetate, nitrate or other ester or mixed ester of cellulose, methyl, ethyl, propyl, butyl or benzyl cellulose or other celluose ether or mixed ether, or ethyl cellulose acetate or oxyethyl cellulose acetate or other ether-ester of cellulose. Preferably the cellulose derivative yarn present in the fabric is made of the same cellulose derivative as the film or other component, and preferably, also, if the softening medium contains a cellulose derivative it is the same as that present in the film or other component and/or in the cellulose derivative constituent of the fabric. The films may contain any suitable additions such as plasticizers, fire retarding agents and the like, for example any of the plasticizers enumerated above. As fire retarding agents tricresyl phosphate, triphenyl phosphate and β-chloronaphthalene may be instanced. Instead of cotton other textile materials may be employed e. g. wool, silk or cellulosic artificial yarns, e. g. yarns made of regenerated cellulose by the viscose or cuprammonium processes.

The following example illustrates the invention but is not to be considered as limiting it in any way:—

A film consisting of 100 parts of cellulose acetate, 35 parts of monomethyl xylene sulphonamides and 10 parts of tricresyl phosphate is treated with an adhesive composition comprising:—

| | |
|---|---|
| Cellulose acetate | 10 grams |
| Triacetin | 3 grams |
| Acetone | 150 ccs. |
| Benzole | 84 ccs. |
| Alcohol | 66 ccs. |
| Diacetone alcohol | 250 ccs. |

The adhesive composition is brushed, sprayed or otherwise applied to the surface of the film and then allowed to dry for a few minutes. The treated film is then pressed on to the cellulose acetate face of a satin fabric woven with a cellulose acetate weft and a cotton warp. The film so treated adheres to the fabric without the application of heat or high pressure. The composite sheet is then allowed to dry. The cotton surface of the composite sheet may readily be stuck to wood or similar material by means of ordinary glue.

If desired composite articles showing colour or other effects may be obtained according to the process of the invention, for example by utilizing a dyed fabric the constituents of which are either dyed a solid shade or different shades or a fabric which contains both dyed and undyed constituents. Thus, when a coloured fabric is employed in conjunction with a mottled film having clear and opaque parts the colouration is visible only through the clear parts of the film and a valuable effect is produced.

By the term "cellulose threads" in the following claims is meant only threads having a basis of cellulose itself, e. g. cotton threads and threads of regenerated cellulose, and the term does not include threads having a basis of substitution derivatives of cellulose.

What I claim and desire to secure by Letters Patent is:—

1. Method of making composite articles containing two components of different natures with respect to adhesion, which comprises uniting the components with the aid of an intermediate layer of textile fabric one face of which consists substantially of threads which are readily capable of firm adhesion directly to one of said components and the other face of which consists substantially of threads which are readily capable of firm adhesion through an adhesive to the other of said components, each component being affixed to the face of the fabric textile consisting substantially of the threads which are readily capable of firm adhesion to the said component.

2. Method of uniting an organic derivative of cellulose material to a material of a kind to which the organic derivative of cellulose is incapable of being readily caused to adhere, which comprises uniting the components with the aid of an intermediate layer of textile fabric one face of which consists substantially of threads which are readily capable of firm adhesion directly to the organic derivative of cellulose material and the other face of which consists substantially of threads which are readily capable of firm adhesion through an adhesive to the other material, each material being affixed to the face of the textile fabric consisting substantially of the threads which are readily capable of firm adhesion to the said material.

3. Method of uniting cellulose acetate to a material of a kind to which cellulose acetate is incapable of being readily caused to adhere, which comprises uniting the cellulose acetate and other material with the aid of an intermediate layer of textile fabric, one face of which consists substantially of cellulose acetate threads and the other face of which consists substantially of threads of a different kind which are readily capable of firm adhesion to the said other material, the cellulose acetate being affixed to the face of the textile fabric consisting substantially of cellulose acetate threads, and the other material being affixed to the other face of the fabric.

4. Method of uniting an artificial film-forming material having a relatively high resistance to penetration by water to a material of relatively low resistance to penetration by water, which comprises uniting the materials with the aid of an intermediate layer of textile fabric one face of which consists substantially of cellulose threads and the other face of which consists substantially of organic derivative of cellulose threads which are readily capable of firm adhesion to said water-resistent material, the water resistant material being affixed to the face of the textile fabric consisting substantially of such organic derivative of cellulose threads and the material of relatively low resistance to penetration by water being affixed to the other face of the fabric by means of an aqueous adhesive.

5. Method of uniting an organic derivative of cellulose material to a material having a relatively low resistance to penetration by water, which comprises uniting the materials with the aid of an intermediate layer of textile fabric, one face of which consists substantially of cellulose threads and the other face of which consists substantially of threads of an organic derivative of cellulose, the organic derivative of cellulose material being affixed directly to the face of the textile fabric consisting substantially of threads of organic derivative of cellulose, and the material of low resistance to penetration by water being affixed to the other face of the fabric by means of an aqueous adhesive.

6. Method of uniting of film of cellulose acetate to a material having a relatively low resistance to penetration by water, which comprises uniting said film and said material with the aid of an intermediate layer of fabric one face of which consists substantially of cellulose acetate threads and the other face of which consists substantially of cellulose threads, the film being affixed to the face of the fabric consisting substantially of cellulose acetate threads, and the material of low resistance to penetration by water being affixed to the other face of the fabric by means of an aqueous adhesive.

7. Method of uniting a film of cellulose acetate to wood, comprising uniting the same with the aid of an intermediate layer of textile fabric, one face of which consists substantially of cellulose acetate threads and the other face of which consists substantially of cellulose threads, the film being affixed to the face of the textile fabric consisting substantially of cellulose acetate threads, and the wood being affixed to the other face of the fabric by means of glue.

8. A composite article comprising two components of different natures with respect to adhesion united by means of a textile fabric containing at least two kinds of thread, one of said components being firmly adherent directly to threads of one material contained in the textile fabric, and the other component being firmly adherent through an adhesive to threads of a different material contained in the textile fabric.

9. A composite article comprising a component having a basis of an organic derivative of cellulose, and a second component of a kind to which the organic derivative of cellulose is incapable of being readily caused to adhere, said components being affixed to opposite faces of a fabric, the organic derivative of cellulose component being firmly adherent to threads of one material contained in the fabric, and the second component being firmly adherent to threads of a different material contained in the fabric.

10. A composite article comprising wood and a film of cellulose acetate affixed to opposite faces of a textile fabric containing threads of cellulose acetate and threads of cellulose material, the cellulose acetate film being firmly adherent to the cellulose acetate threads, and the wood being firmly united to the cellulosic threads by means of glue.

11. A composite article comprising a component having a basis of an organic derivative of cellulose and a second component of a kind to which the organic derivative of cellulose is incapable of being readily caused to adhere, said components being affixed to opposite faces of a textile fabric containing threads of at least two different materials, the face of the textile fabric to which the organic derivative of cellulose is affixed consisting substantially of threads of a material to which the organic derivative of cellulose is readily capable of being firmly adhered and the face of the textile fabric to which the second component is affixed consisting substantially of threads of a different material to which the second component is readily capable of being firmly adhered.

12. Method of making composite articles which comprises causing two components of different nature with respect to adhesion to adhere to a textile fabric containing threads which are readily capable of firm adhesion directly to one of said components, and threads of a different nature which are readily capable of firm adhesion through an adhesive to the other component, by causing each component to adhere to those threads in the textile fabric to which it is capable of firm adhesion.

13. Method of uniting cellulose acetate to a material of a kind to which cellulose acetate is incapable of being readily caused to adhere, which comprises causing the cellulose acetate and the said material to adhere to opposite faces of a textile fabric containing threads of cellulose acetate and threads of a different kind which are readily capable of firm adhesion through an adhesive to the said material, by causing the cellulose acetate to adhere to the cellulose acetate threads in the textile fabric and the said material to adhere to the said threads of a different kind.

14. Method of uniting artificial film-forming material having a relatively high resistance to penetration by water to a material of relatively low resistance to penetration by water, which comprises causing said water-resistant material to adhere directly to threads of an organic derivative of cellulose in one face of a textile fabric containing threads of an organic derivative of cellulose and also threads of cellulose and causing the material of low resistance to penetration by water to adhere to cellulose threads in the other face of the textile fabric by means of an aqueous adhesive.

15. Method of uniting an organic derivative of cellulose material to wood, which comprises causing the said organic derivative of cellulose material to adhere to organic derivative of cellulose threads in one face of a fabric containing threads of an organic derivative of cellulose and also threads of cellulose and causing the wood to adhere to cellulose threads in the other face of the said fabric by means of glue.

16. Method of uniting a film of cellulose acetate to a material having a relatively low resistance to penetration by water, which comprises causing the said film to adhere to cellulose acetate threads in one face of a textile fabric containing cellulose acetate threads and cellulose threads and causing the material of low resistance to penetration by water to adhere to cellulose threads in the other face of said textile fabric by means of an aqueous adhesive.

17. Method of uniting a film of cellulose acetate to wood, which comprises causing said film to adhere to cellulose acetate threads in one face of a textile fabric containing cellulose acetate threads and cellulose threads and causing the wood to adhere to cellulose threads in the other face of said textile fabric by means of glue.

WILLIAM HENRY MOSS.